United States Patent
Einhorn-Cohen et al.

(10) Patent No.: US 12,541,721 B2
(45) Date of Patent: Feb. 3, 2026

(54) METHOD FOR EXTREME CLASS IMBALANCE WITHIN FRAUD DETECTION

(71) Applicant: Actimize LTD., Ra'anana (IL)

(72) Inventors: Michal Einhorn-Cohen, Rosh Haayin (IL); Amir Shachar, Haifa (IL); Danny Butvinik, Haifa (IL)

(73) Assignee: ACTIMIZE LTD., Ra'anana (IL)

( * ) Notice: Subject to any disclaimer, the term of this patent is extended or adjusted under 35 U.S.C. 154(b) by 977 days.

(21) Appl. No.: 17/712,148

(22) Filed: Apr. 3, 2022

(65) Prior Publication Data
US 2023/0316281 A1 Oct. 5, 2023

(51) Int. Cl.
*G06N 20/20* (2019.01)
*G06N 3/0985* (2023.01)
*G06N 7/00* (2023.01)
*G06Q 20/40* (2012.01)

(52) U.S. Cl.
CPC .......... *G06N 20/20* (2019.01); *G06N 3/0985* (2023.01); *G06N 7/00* (2013.01); *G06Q 20/4016* (2013.01)

(58) Field of Classification Search
CPC ........ G06N 20/20; G06N 3/0985; G06N 7/00; G06Q 20/4016; G06Q 40/00
See application file for complete search history.

(56) References Cited

U.S. PATENT DOCUMENTS 11,276,023 B1* 3/2022 Butler ................ G06N 20/00
11,544,713 B1* 1/2023 Hansen .............. G06Q 20/4016
11,961,084 B1* 4/2024 Lauz ................. G06Q 20/4016
2018/0032900 A1* 2/2018 Chowdhury .......... G06N 20/10
(Continued)

OTHER PUBLICATIONS

Giokas, Ioannis, "Distributed Adaptive Learning Transaction Fraud Detection and Prevention System" filed Aug. 2, 2021, U.S. Appl. No. 63/228,403, pp. i-25. (Year: 2021).*

(Continued)

*Primary Examiner* — Miranda M Huang
*Assistant Examiner* — Chase P. Hinckley
(74) *Attorney, Agent, or Firm* — SOROKER AGMON NORDMAN RIBA; Liat Lin

(57) ABSTRACT

A computerized-method for building ensemble of supervised and unsupervised Machine Learning (ML) models for fraud-predictions, for a client having an extremely-imbalanced-dataset, is provided herein. The computerized-method includes: (i) receiving an extremely-imbalanced-dataset from a client for building a ML model; (ii) retrieving datasets of other clients; (iii) identifying a rate-of-dataset-imbalance for each retrieved dataset; (iv) routing each dataset of 'K' datasets with identified rate-of-dataset-imbalance above a preconfigured-threshold to supervised ML models for training thereof and to yield a trained-object; (v) training a meta-learning-supervised ML model by providing the 'K' yielded trained-objects; (vi) routing each dataset of 'L' datasets with identified rate-of-dataset-imbalance below a preconfigured-threshold to an unsupervised ML model to generate clusters; (vii) combining the 'k' supervised ML models and the 'L' unsupervised ML models into ensemble ML models; and (viii) deploying the ensemble ML models in a financial-system in production-environment for prediction of fraud in a financial-transaction.

13 Claims, 8 Drawing Sheets

(56) References Cited

U.S. PATENT DOCUMENTS

| | | | | |
|---|---|---|---|---|
| 2018/0210944 | A1* | 7/2018 | Sukhanov | G06F 18/214 |
| 2019/0213605 | A1* | 7/2019 | Patel | G06Q 30/0185 |
| 2020/0327456 | A1* | 10/2020 | Sathe | G06F 18/24 |
| 2022/0012741 | A1* | 1/2022 | Raj | G06Q 20/405 |
| 2022/0108133 | A1* | 4/2022 | Pati | G06N 3/045 |
| 2022/0383322 | A1* | 12/2022 | Butvinik | G06N 20/20 |
| 2022/0414504 | A1* | 12/2022 | Xu | G06N 20/00 |
| 2023/0031123 | A1* | 2/2023 | Giokas | G06N 5/01 |
| 2023/0206372 | A1* | 6/2023 | Ordorica | H04L 63/0861 705/325 |
| 2023/0306079 | A1* | 9/2023 | Chakravorty | G06F 18/2148 |

OTHER PUBLICATIONS

Zian et al., "An Empirical Evaluation of Stacked Ensembles with Different Meta-Learners in Imbalanced Classification" Jun. 23, 2021, IEEE Access, pp. 87434-87452. (Year: 2021).*

Onan, Aytug, "Consensus Clustering-Based Undersampling Approach to Imbalance Learning" Mar. 3, 2019, Hindawi, pp. 1-14. (Year: 2019).*

Douzas et al., "Improving imbalanced learning through a heuristic oversampling method based on k-means and SMOTE" Jun. 28, 2018, El Sevier Information Sciences, pp. 1-20. (Year: 2018).*

Priscilla et Prabha "Influence of Optimizing XGBoost to handle Class Imbalance in Credit Card Fraud Detection" Oct. 6, 2020, IEEE, pp. 1309-1315. (Year: 2020).*

Hasanin et al., "Experimental Studies on the Impact of Data Sampling with Severely Imbalanced Big Data" Mar. 24, 2020, Reuse in Intelligent Systems Chapter 1, pp. i-30. (Year: 2020).*

Bian et al., "Financial Fraud Detection: A New Ensemble Learning Approach for Imbalanced Data" Jun. 27, 2016, AIS, pp. i-11. (Year: 2016).*

Kabra et al., "MixBoost: Synthetic Oversampling with Boosted Mixup for Handling Extreme Imbalance" Sep. 3, 2020, arXiv:2009.01571v1, pp. 1-10. (Year: 2020).*

Padhi et al., "Tabular Transformers for Modeling Multivariate Time Series" Feb. 11, 2021, arXiv: 2011.01843v2, pp. 1-5. (Year: 2021).*

Lebichot et al., "Transfer Learning Strategies for Credit Card Fraud Detection" Aug. 24, 2021, IEEE Access, pp. 114754-114766. (Year: 2021).*

Ochal et al., "How Sensitive are Meta-Learners to Dataset Imbalance?" Apr. 12, 2021, arXiv: 2104.05344v1, pp. 1-12. (Year: 2021).*

Wang et al., "Imbalance-XGBoost: leveraging weighted and focal losses for binary label-imbalanced classification with XGBoost" Aug. 22, 2021, arXiv: 1908.01672v2, pp. 1-12. (Year: 2021).*

Bansal et al., "MetaBalance: High-Performance Neural Networks for Class-Imbalanced Data" Jun. 17, 2021, arXiv: 2106.09643v1, pp. 1-13. (Year: 2021).*

Wang et al., "'Could You Describe the Reason for the Transfer?': A Reinforcement Learning Based Voice-Enabled Bot Protecting Customers from Financial Frauds" Nov. 2021, pp. 4214-4223. (Year: 2021).*

Bao et al., "Integration of unsupervised and supervised machine learning algorithms for credit risk assessment" Mar. 19, 2019, El Sevier Expert Systems with Applications, pp. 301-315. (Year: 2019).*

Trisanto et al., "Modified Focal Loss in Imbalanced XGBoost for Credit Card Fraud Detection" 2021, INASS Intl Journal of Intelligent Engineering Systems, pp. 350-358. (Year: 2021).*

Cao et al., "TitAnt: Online Real-time Transaction Fraud Detection in Ant Financial" Jun. 18, 2019, arXiv:1906.07407v1, pp. 1-12. (Year: 2019).*

Zheng et al., "Federated Meta-Learning for Fraudulent Credit Card Detection" Jan. 7, 2021, ICJAI-20, pp. 4654-4660. (Year: 2021).*

* cited by examiner

| Dataset | % Class Imbalance<br>Minority class / majority class |
|---|---|
| Dataset A | 6% |
| Dataset B | 11% |
| Dataset C | 0.1% |

| Train | CBLOF | HBOS | Isolation Forest | KNN | LOF | MCD | OCSVM | PCA | All AD _xgb_comb |
|---|---|---|---|---|---|---|---|---|---|
| Precision Recall | 0.0043 | 0.0025 | 0.005 | 0.0043 | 0.0047 | 0.0043 | 0.005 | 0.006 | 0.042 |
| ROC_AUC | 0.697 | 0.559 | 0.671 | 0.595 | 0.592 | 0.699 | 0.795 | 0.728 | 0.895 |
| Precision Recall amount | 0.322 | 0.245 | 0.312 | 0.287 | 0.312 | 0.361 | 0.37 | 0.37 | 0.691 |
| ROC_AUC amount | 0.795 | 0.656 | 0.731 | 0.671 | 0.587 | 0.735 | 0.831 | 0.795 | 0.905 |

| Test | CBLOF | HBOS | Isolation Forest | KNN | LOF | MCD | OCSVM | PCA | All AD _xgb_comb |
|---|---|---|---|---|---|---|---|---|---|
| Precision Recall | 0.0044 | 0.0025 | 0.005 | 0.0041 | 0.0033 | 0.0037 | 0.005 | 0.0041 | 0.025 |
| ROC_AUC | 0.658 | 0.542 | 0.649 | 0.582 | 0.524 | 0.593 | 0.716 | 0.609 | 0.782 |
| Precision Recall amount | 0.318 | 0.248 | 0.308 | 0.306 | 0.326 | 0.326 | 0.363 | 0.329 | 0.528 |
| ROC_AUC amount | 0.747 | 0.635 | 0.708 | 0.633 | 0.507 | 0.605 | 0.782 | 0.642 | 0.792 |

Figure 5

METHOD FOR EXTREME CLASS IMBALANCE WITHIN FRAUD DETECTION

TECHNICAL FIELD

The present disclosure relates to the field of supervised and unsupervised machine learning fraud detection. More specifically, the present disclosure relates to overcoming extreme class imbalance dataset issues when retaining a fraud-detection Machine Learning model.

BACKGROUND

Fraud has become a major problem in the financial sector and its rate is continuously increasing. Because of fraud cases, users are hesitant in making purchases and consequently both the merchants and Financial Institutions (FIs) bear heavy losses. Even though Machine Learning (ML) techniques have been used to detect credit card frauds there are no fraud detection systems having the ability to offer great efficiency or accuracy to date.

In the financial crime domain, fraud detection plays a vital part in preventing a crime and is at the core of the Machine Learning (ML) field. Fraud belongs to an essential area of ML Anomaly Detection (AD). AD lies in the center of data analysis where spikes or significant deviation of the data happen.

Though, fraud is a type of anomaly that belongs to financial crime domain, not every anomaly is fraud, but every fraud is anomaly. Common ways for AD and/or fraud detection are within a wide spectrum of approaches, such as unsupervised and supervised ML, extreme value analysis, probabilistic mixture modeling, and information theoretic approach. One of the most common ML paradigms to tackle fraud detection is supervised ML approach. In supervised ML approach, during training stage of the ML model, all instances, i.e., financial transactions in the provided dataset for the training must have labels. For fraud cases there are two types of labels, which are 'fraud' or 'non-fraud', also known as binary classification.

Major challengers, such as extreme low number of fraudulent transactions, i.e., transactions labeled as fraud, in a dataset may impose a serious problem on the quality of ML models training and their later on performance when the ML models may be deployed in a financial-system. Accordingly, there is a need for a technical solution that will overcome the negative impact of extreme class imbalance on the quality of ML models training for fraud detection and will show better results, e.g., more accurate fraud predictions, in comparison to existing methods.

The supervised approach contains classification and regression type of approaches to predict whether a financial transaction is fraud or not. In classification approach, the prediction form is dichotomous variable that can have either of two outputs: fraud or non-fraud. In regression approach, the prediction form is a regression risk score, a number between 0 and 1, e.g., 0.768 which indicates the probability that a given transaction is fraud or not. The higher the risk score, the higher the probability that the transaction is fraud.

The unsupervised approach is implemented by clustering financial transactions based on its inner properties and then calculating, mainly based on statistical methods, the deviation of particular financial transactions from the clusters they should belong to.

An extreme class imbalance of a dataset for training may be an obstacle within the supervised approach. Extreme class imbalance of a dataset in the context of fraud is a typical phenomenon which means that there are very few financial transactions in a dataset which are labeled as 'fraud', and all the rest of the financial transactions in the dataset are labeled as 'non-fraud'.

An extreme class imbalance of a dataset in fraud detection may negatively affect the classification or regression training of a ML model, because the ML model cannot learn adequately on such a small fraction of minority class and huge majority class. A large number of False-Positive (FP) predictions may impose serious issues for clients, i.e., Financial Institutions (FI)s, since they need to spend a lot of staff and resources for investigations that end as false. On the other hand, the unsupervised approach detours the problem of extreme class imbalance since it does not need labels, but when implemented by itself also suffers from inaccuracies in its predictions, e.g., anomalies which are not fraud.

Accordingly, there is a need for a technical solution for building an ensemble of supervised and unsupervised Machine Learning (ML) models for more accurate fraud predictions, for a client having an extremely imbalanced dataset.

SUMMARY

There is thus provided, in accordance with some embodiments of the present disclosure, a computerized-method for building an ensemble of supervised and unsupervised Machine Learning (ML) models for fraud predictions, for a client having an extremely imbalanced dataset. The extremely imbalanced dataset is a dataset of financial transactions.

Furthermore, in accordance with some embodiments of the present disclosure, computerized-method includes: (i) receiving an extremely imbalanced dataset of financial transactions from a client for building a ML model; (ii) retrieving datasets of financial transactions of other clients based on one or more criteria: (iii) identifying a rate of dataset imbalance for each retrieved dataset; (iv) routing each dataset of 'K' datasets with identified rate of dataset imbalance above a preconfigured threshold to a supervised ML models for training thereof. Each dataset may be routed to a different supervised ML model of 'K' supervised ML models to yield a trained object; (v) training a meta-learning-supervised ML model by providing the 'K' yielded trained objects; (vi) routing each dataset of 'L' datasets with identified rate of dataset imbalance below a preconfigured threshold to an unsupervised ML model to generate clusters. Each dataset may be routed to a different unsupervised ML mode of 'L' unsupervised ML models; (vii) combining the 'k' supervised ML models and the 'L' unsupervised ML models into ensemble ML models: and (viii) deploying the ensemble ML models in a financial-system in production-environment for prediction of fraud in a financial transaction. The financial transaction may be received in a stream of financial transactions.

Furthermore, in accordance with some embodiments of the present disclosure, the prediction of fraud of each financial transaction in the stream of financial transactions may be a regression risk-score.

Furthermore, in accordance with some embodiments of the present disclosure, an extremely imbalanced dataset may be a dataset having a rate between an amount of fraud transactions and an amount of non-fraud transactions below 0.0001%.

Furthermore, in accordance with some embodiments of the present disclosure, the one or more criteria may be selected from at least one of (i) business activity; (ii)

population segment; (iii) ratio between an amount of fraud transactions and an amount of non-fraud.

Furthermore, in accordance with some embodiments of the present disclosure, the rate of dataset imbalance may be calculated by dividing an amount of fraud transactions by an amount of non-fraud transactions.

Furthermore, in accordance with some embodiments of the present disclosure, the final-supervised ML model may be selected from XGBoost or any other supervised ML models.

Furthermore, in accordance with some embodiments of the present disclosure, the unsupervised ML model may be selected from: Cluster-based Local Outlier Factor (CBLOF), Histogram-based Outlier Score (HBOS), Isolation Forest, k-nearest neighbors (KNN), Local Outlier Factor (LOF), Minimum Covariance Determinant (MCD), One-Class Support Vector Machines (OCSVM) and Principal Component Analysis (PCA).

Furthermore, in accordance with some embodiments of the present disclosure, the computerized-method may be further comprising: deploying the ensemble of ML models for fraud predictions and when receiving a financial transaction operating the ensemble of ML models to predict a regressing risk score of the financial transaction.

Furthermore, in accordance with some embodiments of the present disclosure, the operating of the ensemble of ML models comprises: (i) applying one or more trained supervised ML models on the received financial transaction to derive a score from each trained supervised ML model; (ii) providing an aggregation of a weighted score of each of the 'K' yielded scores to a trained-supervised ML model; (iii) operating the trained meta-learning-supervised ML model to yield learning parameters: (iv) routing the received financial transaction to each unsupervised ML model of the 'L' unsupervised ML models to yield a score from each unsupervised ML model: (v) deriving a second-final-score from 'L' weighted scores of the unsupervised ML models and sending the second-final-score and the learning parameters from the meta-learning-supervised ML model to a transferred-supervised ML model.

Furthermore, in accordance with some embodiments of the present disclosure, the learning parameters are a first-final-score and a calculated average-weight-supervised and operating the transferred-supervised ML model to yield the regression risk score of the financial transaction by calculating a sum of the calculated average-weight-supervised from the first-final-score and a calculated average-weight-unsupervised from the second-final-score.

Furthermore, in accordance with some embodiments of the present disclosure, the first-final-score may be calculated based on formula I:

$$\text{first-final-score} = \frac{1}{k}\sum_{i=0}^{k}(\text{score}_i * w_i) \quad (I)$$

whereby:
k is a number of datasets having dataset imbalance above a preconfigured threshold, $\text{score}_i$ is a risk score yielded by a trained supervised ML model$_i$ for the financial transaction, and
$w_i$ is a weight of dataset i, the weight is based on a rate of dataset imbalance that related supervised ML model has been trained on.

Furthermore, in accordance with some embodiments of the present disclosure, the second-final-score may be calculated based on formula II:

$$\text{second-final-score} = \frac{1}{L}\sum_{i=0}^{L}(\text{score}_i * w_i) \quad (II)$$

whereby:
L is a number of datasets having dataset imbalance below a preconfigured threshold, $\text{score}_1$ is a risk score yielded by an unsupervised ML model, for the financial transaction, and
$w_i$ is a weight of dataset i, the weight is based on a rate of dataset imbalance that related unsupervised ML model has been provided to.

Furthermore, in accordance with some embodiments of the present disclosure, the 'K' yielded trained objects may be provided to the final-supervised ML model each with an attributed weight.

Furthermore, in accordance with some embodiments of the present disclosure, the attributed weight may be based on a rate of dataset imbalance that related supervised ML mode has been trained on.

Furthermore, in accordance with some embodiments of the present disclosure, the average-weight-supervised may be calculated based on formula III:

$$\text{average-weight-supervised} = \frac{1}{K}\sum_{i=1}^{K}w_i \quad (III)$$

whereby:
k is a number of datasets having dataset imbalance above a preconfigured threshold, and
wi is a weight of dataset i, the weight is based on a rate of dataset imbalance that related supervised ML model has been trained on.

Furthermore, in accordance with some embodiments of the present disclosure, the average-weight-unsupervised may be calculated based on formula IV:

$$\text{average-weight-supervised} = \frac{1}{L}\sum_{i=1}^{K}w_i \quad (IV)$$

whereby:
L is a number of datasets having dataset imbalance below a preconfigured threshold, and
wi is a weight of dataset i, the weight is based on a rate of dataset imbalance that related unsupervised ML model has been provided to.

BRIEF DESCRIPTION OF THE DRAWINGS

In order for the present invention, to be better understood and for its practical applications to be appreciated, the following Figures are provided and referenced hereafter. It should be noted that the Figures are given as examples only and in no way limit the scope of the invention. Like components are denoted by like reference numerals.

FIG. 3 is an example for different class imbalance in different datasets, in accordance with some embodiments of the present invention;

FIG. 5 is a table with types of unsupervised models, in accordance with some embodiments of the present invention.

DETAILED DESCRIPTION

Figure 1A:
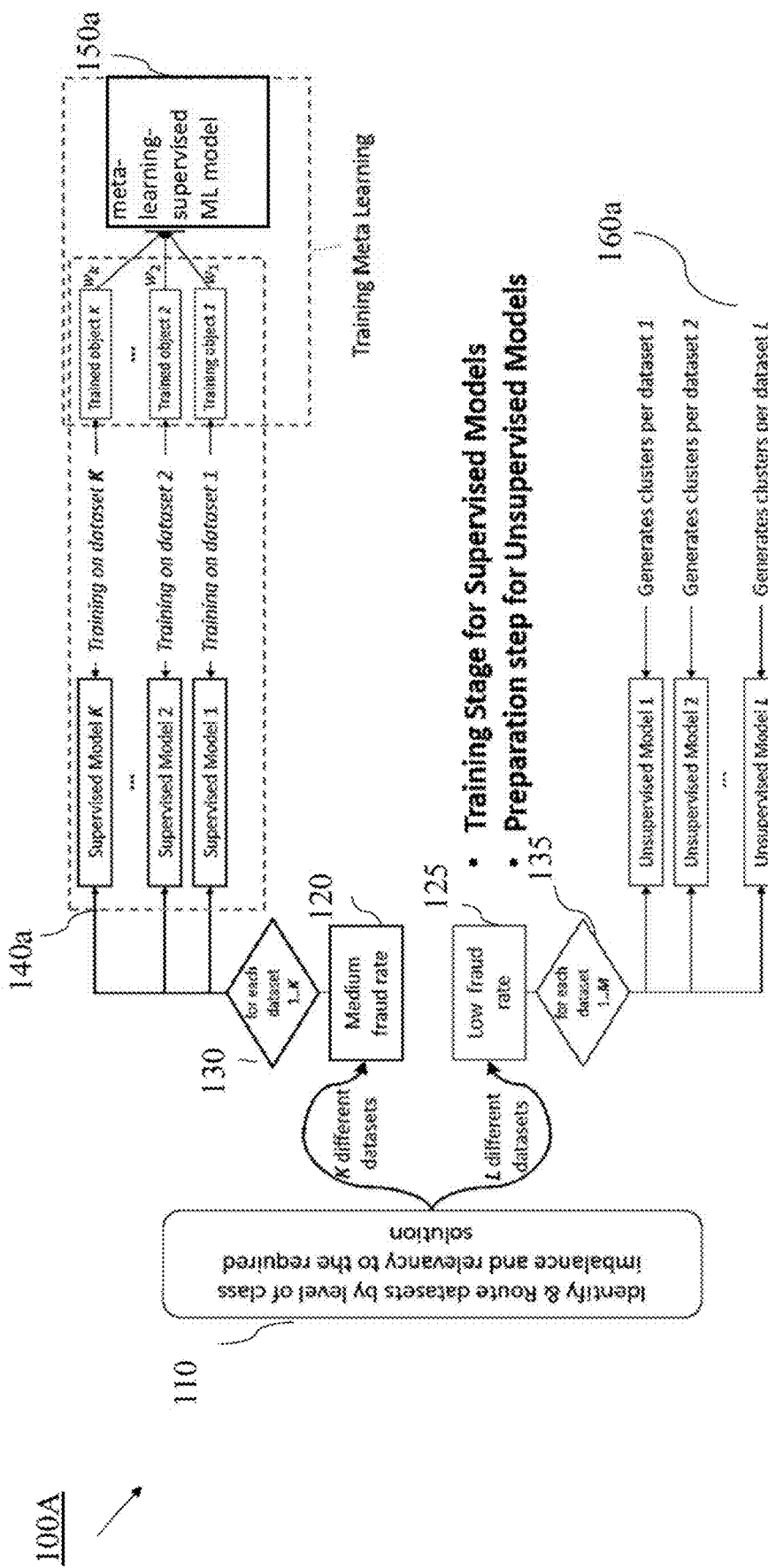
FIG. 1A is a high-level diagram of a computerized-method for building ensemble of Machine Learning (ML) models for fraud predictions, for a client having an extremely imbalanced dataset, in accordance with some embodiments of the present invention.

In the following detailed description, numerous specific details are set forth in order to provide a thorough understanding of the disclosure. However, it will be understood by those of ordinary skill in the art that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes.

Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

The terms "dataset" as used herein refer to a collection of data that is comprised of financial transactions of a business activity.

According to some embodiments of the present disclosure, different datasets contain different skewness in their data distribution, as shown in table 300 in FIG. 3.

A class imbalance in a dataset is a known type of problem in classification approach. In fraud detection this problem becomes critical since there is one transaction that is labeled as fraud to 10,000 transactions which are labeled as non-fraud. The class imbalance is measured by the ratio between minority class, e.g., frauds and majority class, e.g., non-frauds.

A typical class imbalance or skewed data or low fraud known in the industry or academy is around 5%-15%, while extreme class imbalance in financial crime domain can reach 0.0001%. When an ML model trains on 15% skewed data it may perform better than when it trains on 5% skewed data.

Extreme class imbalance in fraud imposes a huge problem when training a classification or regression ML model, because the model cannot learn adequately on such a small fraction of minority class and the huge majority class. The possible outcome of such training may be a biased model with a lot of inaccurate predictions, such as False Positives (FPs). FP means that the ML model makes a fraud prediction for a particular transaction, e.g., fraudulent transaction, while the transaction is non-fraud.

A large number of FPs imposes serious issues on Financial Institutions (FI)s, because a lot of staff and resources are spent for investigations that turns out to be false. On the other hand, the unsupervised approach detours the problem of extreme class imbalance dataset since it does not need labels, but when implemented by itself also suffers from inaccuracies in its predictions.

Accordingly, there is a need for a technical solution for building an ensemble of supervised and unsupervised Machine Learning (ML) models based on consortium data, e.g. data of various dataset of other clients having different rates of dataset imbalance, for more accurate fraud predictions, for a client having an extremely unbalanced dataset.

FIG. 1A is a high-level diagram of a computerized-method 100A for building ensemble of Machine Learning (ML) models for fraud predictions, for a client having an extremely imbalanced dataset, in accordance with some embodiments of the present invention.

According to some embodiments of the present disclosure, to overcome the problem of extreme class imbalance, a hybrid approach of supervised and unsupervised ML models is provided herein. Multiple Anomaly Detection (AD) algorithms, e.g., unsupervised models may be used and combined with supervised learning and transfer learning to achieve a higher performance, e.g., accurate fraud predictions.

According to some embodiments of the present disclosure, consortium data, e.g., datasets from various clients having different rates of dataset imbalance may be used to adapt to the problem of detecting fraud when an extreme class imbalance dataset, e.g., low fraud, for building an ML model is provided by a client.

According to some embodiments of the present disclosure, the client may be a financial institution having a financial-system that is running a fraud-detection ML model to detect fraud in received financial transactions.

According to some embodiments of the present disclosure, the accuracy of the fraud-detection ML model may be increased by the use of supervised and unsupervised learning to lift the unsupervised performance that is currently used for its better performance for low-fraud cases.

According to some embodiments of the present disclosure, a computerized-method, such as computerized-method 100A for building ensemble of Machine Learning (ML) models for fraud predictions, for a client having an extremely imbalanced dataset, is provided herein.

According to some embodiments of the present disclosure, meta-learning is when in both supervised and unsupervised phases there is a final model which learns and predicts based on the outputs of previous models.

According to some embodiments of the present disclosure, the computerized-method 100A may be hybrid transfer meta-learning method for extreme class imbalance within fraud detection. The computerized-method 100A may use a hybrid paradigm of supervised and unsupervised approach by applying a meta-learning approach in which the final models learn from the insights of previous models. Then, the computerized-method 100A may fuse both approaches by utilizing transfer learning, where valuable insights from the supervised part to the unsupervised part may be provided for extreme class imbalance within fraud detection.

According to some embodiments of the present disclosure, in each paradigm of supervised and unsupervised models, risk scores may be collected from different models and then an average weight may be calculated to provide a weighted average score.

According to some embodiments of the present disclosure, the output of previous models which is a weighted average score, serves as an input to the final model. If the outputs of model A, e.g., trained meta-learning-supervised ML model 150b in FIG. 1B serve as inputs to model B, e.g., transferred supervised ML model 180 in FIG. 1B, then this process is named "Meta-Learning" or learning about learning.

According to some embodiments of the present disclosure, upon receiving an extremely unbalanced dataset from a client for building an ML model, the computerized-method 100A may retrieve datasets of other clients based on one or more criteria from one or more databases.

According to some embodiments of the present disclosure, the one or more criteria may be selected from at least one of: (i) business activity; (ii) population segment; (iii) ratio between an amount of fraud transactions and an amount of non-fraud and other criteria. The business activity may be for example. Mobile person-to-person M_P2P, web transfer and the like.

According to some embodiments of the present disclosure, the computerized-method 100A may identify and route datasets by the level of its imbalance and relevance to the required solution by the client 110.

According to some embodiments of the present disclosure, the dataset imbalance related to the amount of fraud transactions vs. the amount of non-fraud transactions. A rate of dataset imbalance may be calculated by dividing an amount of fraud transactions by an amount of non-fraud transactions, as shown in table 300 in FIG. 3.

According to some embodiments of the present disclosure, a rate of dataset imbalance for each retrieved dataset may be identified and then each dataset of 'K' datasets with identified rate of dataset imbalance above a preconfigured threshold, e.g., medium fraud rate 120, may be routed to 'K' supervised ML models for training thereof.

According to some embodiments of the present disclosure, each dataset of the 'K' datasets 130 may be routed to a different supervised ML model of 'K' supervised ML models to yield a trained object 140a. A trained object is an artifact that is outputted by a trained supervised model and contains compressed hidden information about the model, its parameters, its decision borderline that classifies between classes and other things.

According to some embodiments of the present disclosure, together with a preconfigured weight per each training dataset it is passed to the final meta-learning model, such as meta-learning-supervised ML model 150a, and by doing so training it. Instead of a training dataset, the final meta-learning model 150a is provided with trained objects from different supervised models with its weights.

According to some embodiments of the present disclosure, a meta-learning-supervised ML model 150a may be trained by providing a weighted trained object of each of the 'K' yielded trained objects thereto. The meta-learning-supervised ML model 150a may be XGBoost or any other supervised ML model.

According to some embodiments of the present disclosure, a preparation step for 'L' unsupervised models may include routing each dataset of 'L' datasets with identified rate of dataset imbalance below a preconfigured threshold, e.g., low fraud rate 125, to an unsupervised ML model to generate clusters 160a. Each dataset of the 'L' datasets 135 may be routed to a different unsupervised ML mode of the 'L' unsupervised ML models.

According to some embodiments of the present disclosure, each dataset of the datasets, e.g., high-medium data, i.e., rate of dataset imbalance above a preconfigured threshold and low-fraud rate data, i.e., rate of dataset imbalance below a preconfigured threshold may be in the form of a pandas data frame.

According to some embodiments of the present disclosure, the unsupervised ML model of the 'L' unsupervised ML models may be selected from: Cluster-based Local Outlier Factor (CBLOF), Histogram-based Outlier Score (HBOS), Isolation Forest, k-nearest neighbors (KNN), Local Outlier Factor (LOF), Minimum Covariance Determinant (MCD), One-Class Support Vector Machines (OCSVM) and Principal Component Analysis (PCA), as shown in table 600 in FIG. 6.

Figure 1B:
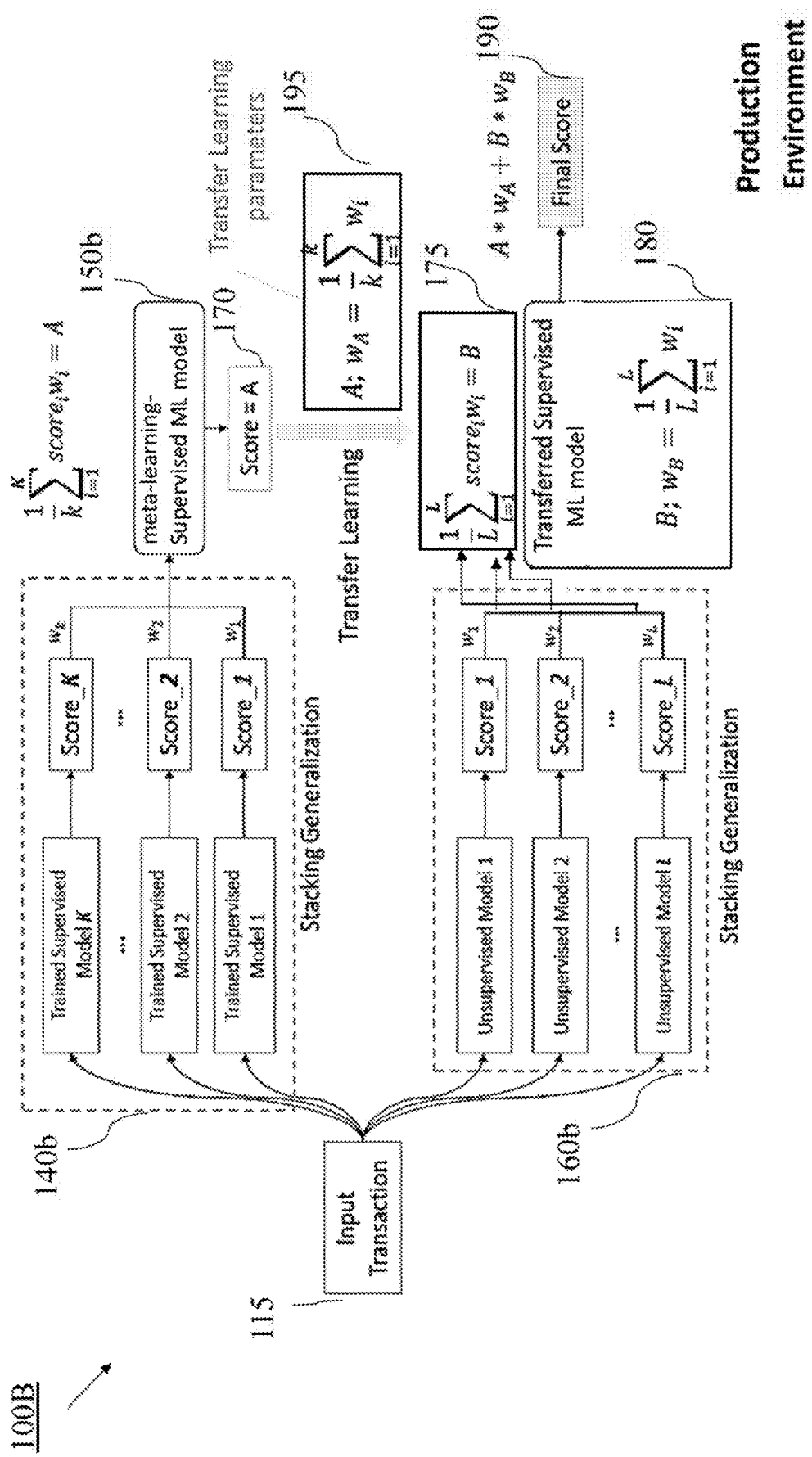
FIG. 1B is a high-level flow of fraud detection in production environment, in accordance with some embodiments of the present invention.

FIG. 1B is a high-level flow of fraud detection 100B in production environment, in accordance with some embodiments of the present invention.

According to some embodiments of the present disclosure, each input transaction 115 may be forwarded to a supervised part 140b and also to an unsupervised part 160b. The output of the supervised part 140b may be forwarded to a meta-learning-supervised model 150b to derive learning parameters 195 which are a first-final-score, e.g., A 170 and a calculated average-weight-supervised, e.g., $w_A$.

According to some embodiments of the present disclosure, transfer learning may be operated when the learning parameters 195 may be transferred to transferred supervised ML model 180. For example, when the first-final-score, e.g., A 170 may be 0.77 and a second-final-score derived from the transferred-supervised ML model 180 is 0.67, then the regression risk score may be equal to 0.77*wA+0.67*wB, whereby $w_B$ is a calculated average-weight-unsupervised.

According to some embodiments of the present disclosure, the computerized-method 100A in FIG. 1A may further deploy the ensemble ML models 150a and 160a in FIG. 1A in a financial-system in production-environment for prediction of fraud of a financial transaction 115 by predicting a regressing risk score thereof. The financial transaction may be received in a stream of financial transactions.

According to some embodiments of the present disclosure, the operating of the ensemble of ML models may include: (i) applying one or more trained supervised ML models 140b on the received financial transaction 115 to derive a score from each trained supervised ML model; (ii) providing an aggregation of a weighted score of each score of the 'K' yielded scores to a trained-supervised ML model, such as meta-learning-supervised ML model 150b (iii) operating the trained meta-learning-supervised ML model 150b to yield learning parameters. The learning parameters may be a first-final-score 170 and a calculated average-weightsupervised. (iv) routing the received financial transaction to each unsupervised ML model of the 'L' unsupervised ML models to yield a score from each unsupervised ML model 160b: (v) deriving a second-final-score 175 from 'L' weighted scores of the unsupervised ML models and sending the second-final-score and the learning parameters from the meta-leaning-supervised ML model 150b to a transferred-supervised ML model 180.

According to some embodiments of the present disclosure, operating the transferred-supervised ML model 180 to yield a regression risk score by calculating a sum of the calculated average-weight-supervised from the first-final-score and a calculated average-weight-unsupervised from the second-final-score.

According to some embodiments of the present disclosure, the first-final-score 170 may be calculated based on formula I:

$$\text{first-final-score} = \frac{1}{k}\sum_{i=0}^{k}(\text{score}_i * w_i) \quad (I)$$

whereby:
k is a number of datasets having a rate of dataset imbalance above a preconfigured threshold,
$\text{score}_i$ is a risk score yielded by a trained supervised ML $\text{model}_i$ for the financial transaction, and
$w_i$ is a weight of dataset i, the weight is based on a rate of dataset imbalance that related supervised ML model has been trained on.

According to some embodiments of the present disclosure, the second-final-score 175 may be calculated based on formula II:

$$\text{second-final-score} = \frac{1}{L}\sum_{i=0}^{L}(\text{score}_i * w_i) \quad (II)$$

whereby:
L is a number of datasets having a rate of dataset imbalance below a preconfigured threshold,
scorei is a risk score yielded by an unsupervised ML modeli for the financial transaction, and
wi is a weight of dataset i, wherein the weight is based on a rate of dataset imbalance that related unsupervised ML model has been provided to.

According to some embodiments of the present disclosure, the 'K' yielded trained objects may be provided to the final-supervised ML model, e.g. meta-learning-supervised ML model 150b, each with an attributed weight. The attributed weight may be based on a rate of dataset imbalance that related supervised ML mode has been trained on.

According to some embodiments of the present disclosure, the average-weight-supervised may be calculated based on formula III:

$$\text{average-weight-supervised} = \frac{1}{K}\sum_{i=1}^{K} w_i \quad (III)$$

whereby:
k is a number of datasets having a rate of dataset imbalance above a preconfigured threshold, and
wi is a weight of dataset i, the weight is based on a rate of dataset imbalance that a related supervised ML model has been trained on.

According to some embodiments of the present disclosure, the average-weight-unsupervised may be calculated based on formula IV:

$$\text{average-weight-supervised} = \frac{1}{L}\sum_{i=1}^{K} w_i \quad (IV)$$

whereby:
L is a number of datasets having a rate of dataset imbalance below a preconfigured threshold, and
$w_i$ is a weight of dataset i, the weight is based on a rate of dataset imbalance that related unsupervised ML model has been provided to.

According to some embodiments of the present disclosure, the 'k' supervised ML models and the 'L' unsupervised ML models may be combined into an ensemble ML models. The final-supervised ML model 180 may be selected from XGBoost or any other supervised ML models.

Figure 2A:
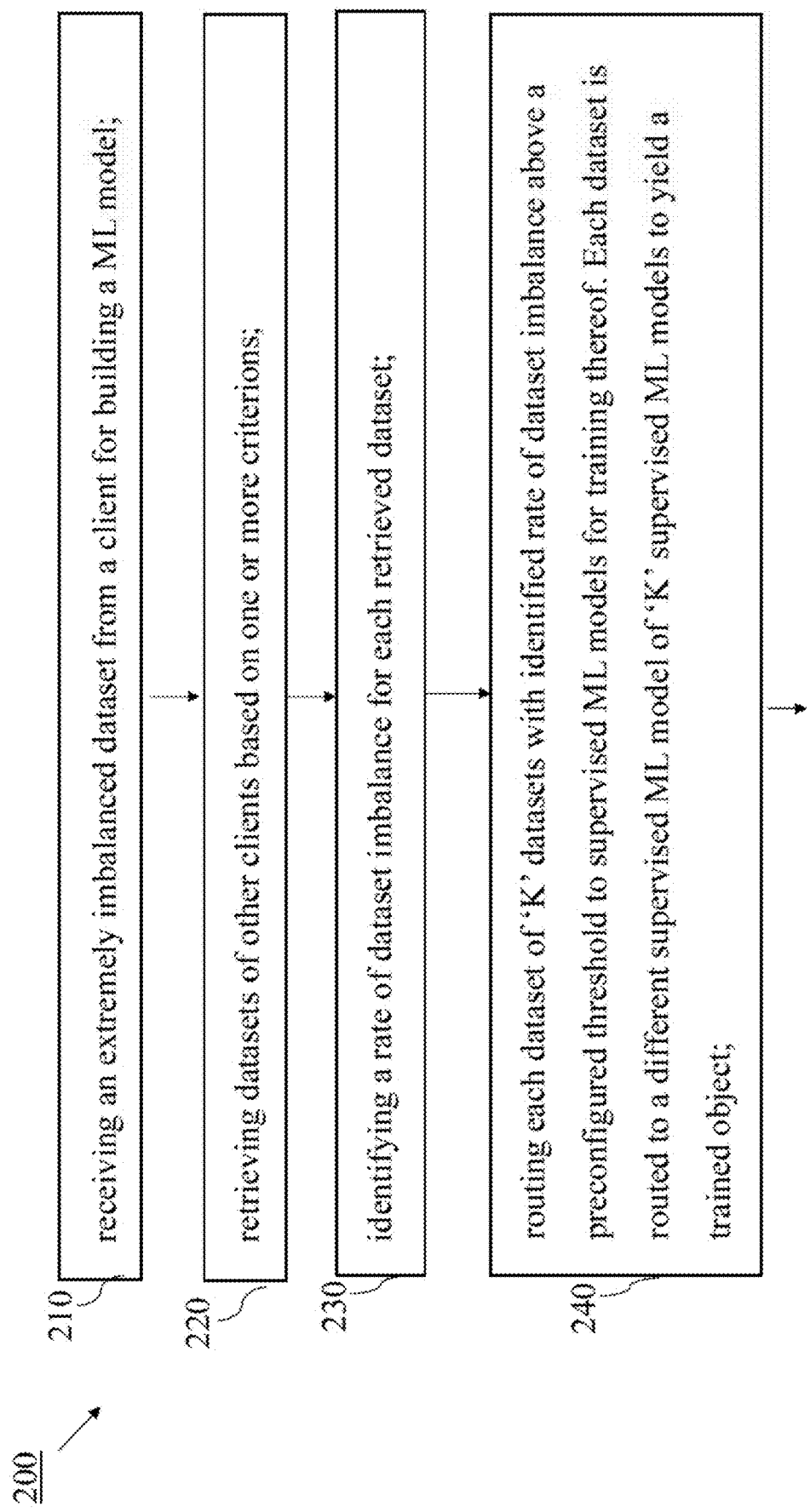
FIGS. 2A-2B are representing a flowchart depicting operations performed by a computerized-method for building ensemble of Machine Learning (ML) models for fraud predictions, for a client having an extremely unbalanced dataset, in accordance with some embodiments of the present invention.
Figure 2B:
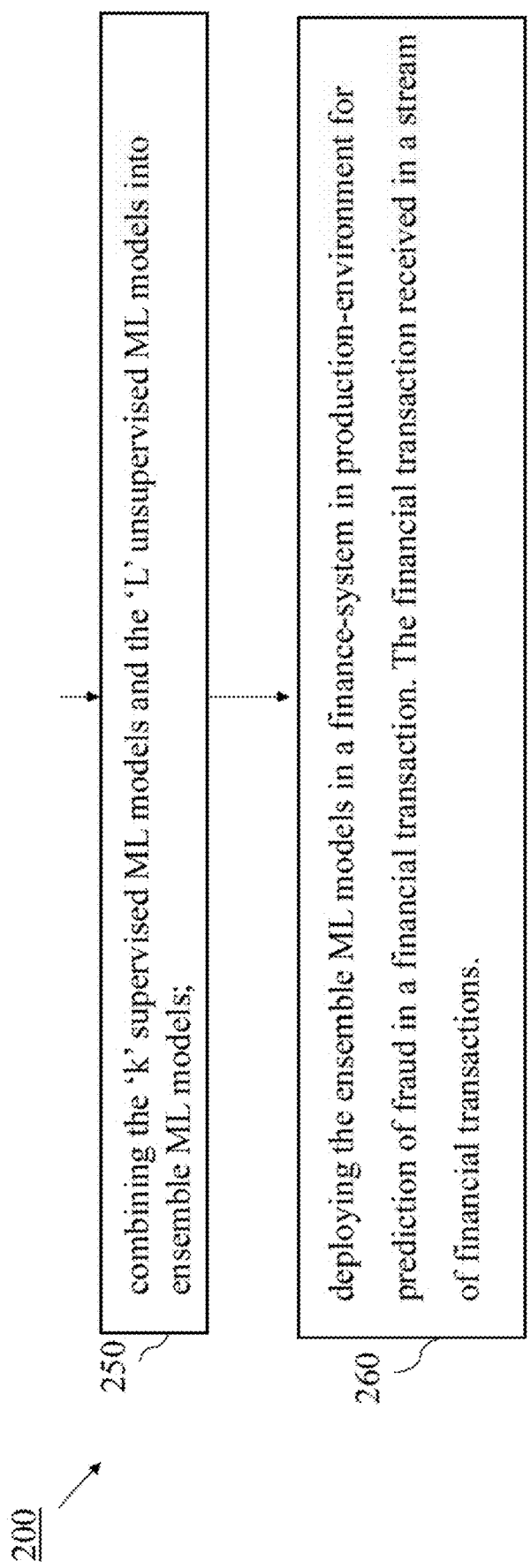

FIGS. 2A-2B are representing a flowchart depicting operations performed by a computerized-method for building ensemble of Machine Learning (ML) models for fraud predictions, for a client having an extremely imbalanced dataset 200, in accordance with some embodiments of the present invention.

According to some embodiments of the present disclosure, operation 210 may comprise receiving an extremely imbalanced dataset from a client for building an ML model. The ML model may be used for fraud predictions when deployed in a financial-system of the client in production environment.

According to some embodiments of the present disclosure, operation 220 may comprise retrieving datasets of other clients based on one or more criteria.

According to some embodiments of the present disclosure, operation 230 may comprise identifying a rate of dataset imbalance for each retrieved dataset. The one or more criteria may be selected from at least one of: (i) business activity: (ii) population segment; (iii) ratio between an amount of fraud transactions and an amount of non-fraud.

According to some embodiments of the present disclosure, operation 240 may comprise routing each dataset of 'K' datasets with identified rate of dataset imbalance above a preconfigured threshold to supervised ML models for training thereof. Each dataset is routed to a different supervised ML model of 'K' supervised ML models to yield a trained object, as shown in FIG. 1A.

According to some embodiments of the present disclosure, operation 250 may comprise combining the 'k' supervised ML models and the 'L' unsupervised ML models into ensemble ML models.

According to some embodiments of the present disclosure, operation 260 may comprise deploying the ensemble ML models in a finance-system in production-environment for prediction of fraud in a financial transaction, as shown in FIG. 1B. The financial transaction may be received in a stream of financial transactions.

Figure 4:
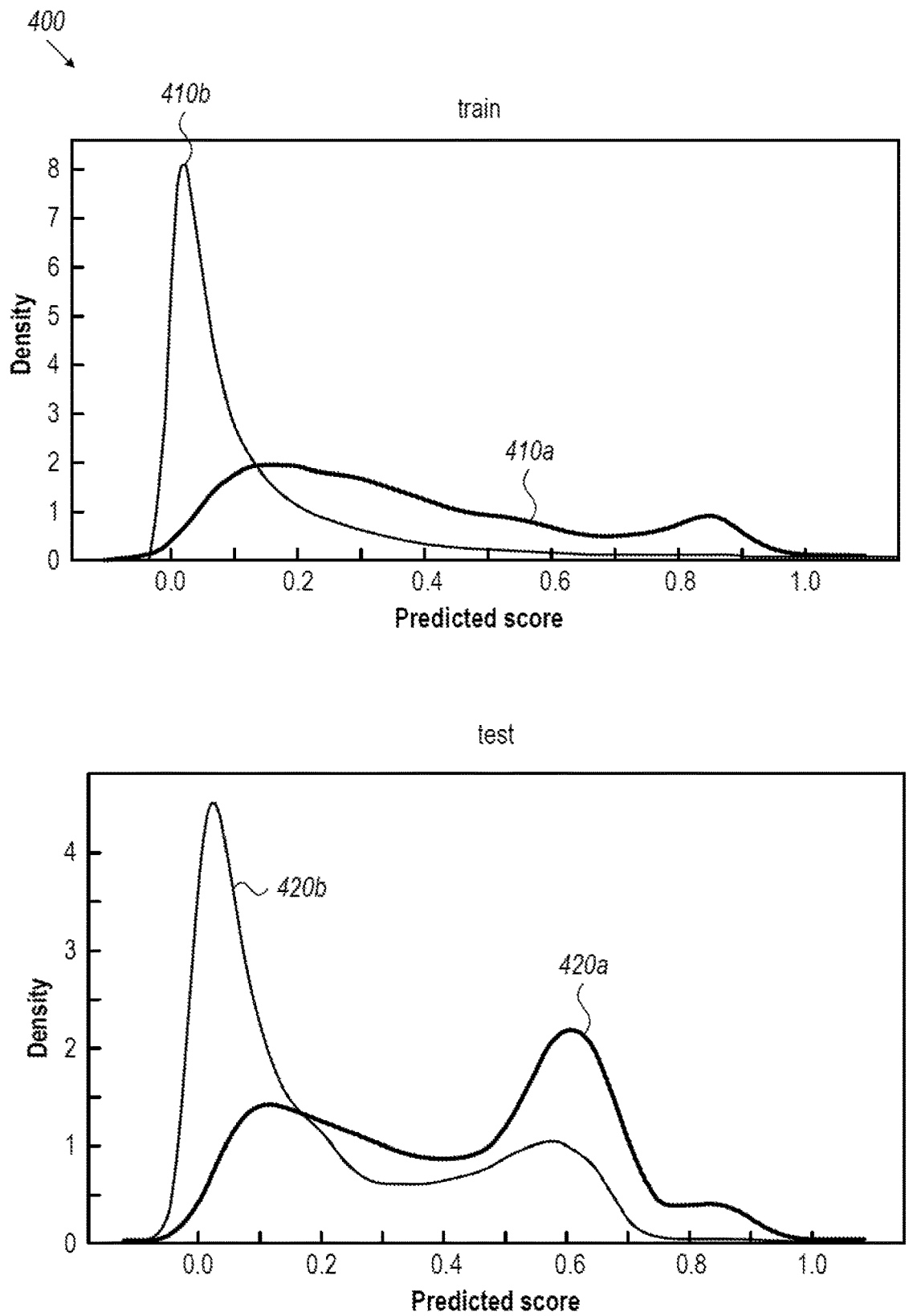
FIG. 4 shows two graphs with a summary of results presented for a combination of algorithms, in accordance with some embodiments of the present invention.

FIG. 4 shows two graphs 400 with a summary of results presented for a combination of algorithms, in accordance with some embodiments of the present invention.

According to some embodiments of the present disclosure, the two graphs show a high distinction between clean transaction scores and fraud transactions both in training and test environments.

According to some embodiments of the present disclosure, curve 410*a* represents fraud scores and curve 410*b* represents clean scores in the training environment, when a computerized-method, such as computerized-method for building ensemble of Machine Learning (ML) models for fraud predictions, for a client having an extremely imbalanced dataset 200 is implemented.

According to some embodiments of the present disclosure, curve 420*a* represents fraud scores and curve 420*b* represents clean scores in test environment, when a computerized-method, such as computerized-method for building ensemble of Machine Learning (ML) models for fraud predictions, for a client having an extremely unbalanced dataset 200 is implemented.

According to some embodiments of the present disclosure, in each graph the 'Y' axis represents the density of the transactions, e.g., how many transactions are close to each other by certain parameters, such as amount of transfer money, or withdrawn money or income. The 'X' axis represents the predicted score during training or during test.

FIG. 5 is a table 500 with types of unsupervised models, in accordance with some embodiments of the present invention.

According to some embodiments of the present disclosure, the unsupervised ML models may be selected from: Cluster-based Local Outlier Factor (CBLOF), Histogram-based Outlier Score (HBOS), Isolation Forest, k-nearest neighbors (KNN), Local Outlier Factor (LOF), Minimum Covariance Determinant (MCD). One-Class Support Vector Machines (OCSVM) and Principal Component Analysis (PCA).

According to some embodiments of the present disclosure, for each of the unsupervised ML models separately the metrics 510 show worse results than combines unsupervised models during training and in test environment 520 when operated to provide a risk score for a financial transaction by a computerized-method for building an ensemble of Machine Learning (ML) models for fraud predictions, for a client having an extremely imbalanced dataset, such as computerized-method 200 in FIGS. 2A-2B, both for training and test set.

According to some embodiments of the present disclosure, the metrics 510 may be Precision_Recall which shows the tradeoff between precision and recall for different thresholds, ROC_AUC: Area Under the Curve (AUC) is the measure of the ability of a classifier to distinguish between classes and is used as a summary of the ROC curve. The higher the AUC, the better the performance of the model. Precision_Recall_Amount: cumulative amount of Precision_Recall per certain number of transactions. ROC_AUC_Amount: cumulative amount of ROC_AUC per certain number of transactions.

Figure 6:
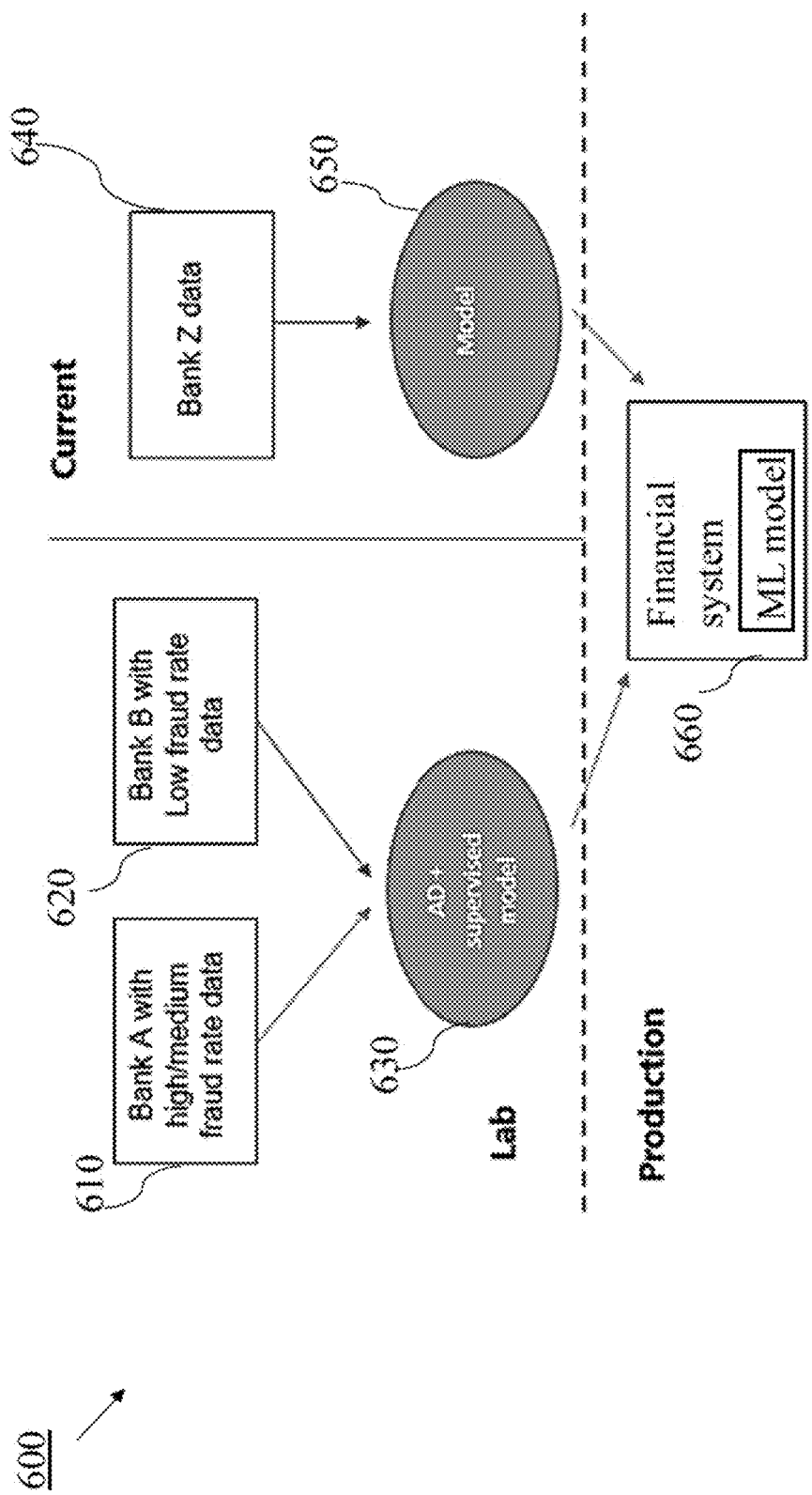
FIG. 6 is a high-level diagram showing existing models vs. ensemble of Machine Learning (ML) models for fraud predictions, in accordance with some embodiments of the present invention.

FIG. 6 is a high-level diagram 600 showing existing models vs. ensemble of Machine Learning (ML) models for fraud predictions, in accordance with some embodiments of the present invention.

According to some embodiments of the present disclosure, a client having an extremely imbalanced dataset, such as bank B with low-fraud rate data 620 may require an ML model for fraud detection. To overcome the problem of the extremely imbalanced dataset, a computerized-method, such as computerized-method 200 in FIGS. 2A-2B and such as computerized-method 100A-100B in FIGS. 1A-1B may retrieve datasets of other clients based on one or more criterions, such as bank A with high/medium fraud rate data 610.

According to some embodiments of the present disclosure, the computerized-method, such as computerized-method 200 in FIGS. 2A-2B and such as computerized-method 100A-100B in FIGS. 1A-1B may generate an ensemble of ML models 630, as in operation 250 in FIG. 2B and deploy the ensemble ML models in a system, such as financial-system 660 or in an Investigation Fraud Management system (IFM) as a containerized model serving API calls e.g., an explanation to a user who will install the ML model in production environment.

According to some embodiments of the present disclosure, current solutions utilize bank Z data 640 to build an ML model 650 and then deploy it in production environment.

In case of an extreme class imbalance of the data of bank Z it may negatively affect the classification or regression training of a ML model 650, because the ML model 650 cannot learn adequately on such a small fraction of minority class and huge majority class.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus, certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

What is claimed:

1. A computerized-method for building ensemble of supervised and unsupervised Machine Learning (ML) models for fraud predictions, for a client having an extremely imbalanced dataset, said computerized-method comprising:

receiving an extremely imbalanced dataset of financial transactions from a client for building a ML model;

retrieving datasets of financial transactions of other clients based on one or more criteria;

identifying a rate of dataset imbalance for each retrieved dataset;

routing each dataset of 'K' datasets with identified rate of dataset imbalance above a preconfigured threshold to supervised ML models for training thereof, wherein each dataset is routed to a different supervised ML model of 'K' supervised ML models to yield a trained object;

training a meta-learning-supervised ML model by providing the 'K' yielded trained objects;

routing each dataset of 'L' datasets with identified rate of dataset imbalance below the preconfigured threshold to an unsupervised ML model to generate clusters, wherein each dataset is routed to a different unsupervised ML mode of 'L' unsupervised ML models;

combining the 'k' supervised ML models and the 'L' unsupervised ML models into ensemble ML models;

deploying the ensemble ML models in a financial-system in production-environment for prediction of fraud in a financial transaction, said financial transaction received in a stream of financial transactions;

deploying the ensemble of ML models for fraud predictions and when receiving a financial transaction operating the ensemble of ML models to predict a regressing risk score, wherein the operating of the ensemble of ML models comprises: (i) applying one or more trained supervised ML models on the received financial transaction to derive a score from each trained supervised ML model; (ii) providing an aggregation of a weighted score of each score of the 'K' yielded scores to a trained-supervised ML model; (iii) operating the trained meta-learning-supervised ML model to yield learning parameters; (iv) routing the received financial transaction to each unsupervised ML model of the 'L' unsupervised ML models to yield a score from each unsupervised ML model; (v) deriving a second-final-score from 'L' weighted scores of the unsupervised ML models and sending the second-final-score and the learning parameters from the meta-learning-supervised ML model to a transferred-supervised ML model, wherein the learning parameters are a first-final-score and a calculated average-weight-supervised, and (vi) operating the transferred-supervised ML model to yield the regression risk score, by calculating a sum of the calculated average-weight-supervised from the first-final-score and a calculated average-weight-unsupervised from the second-final-score.

2. The computerized-method of claim 1, wherein an extremely imbalanced dataset is a dataset having a rate between an amount of fraud transactions and an amount of non-fraud transactions below 0.0001%.

3. The computerized-method of claim 1, wherein the one or more criteria are selected from at least one of: (i) business activity; (ii) population segment; (iii) ratio between an amount of fraud transactions and an amount of non-fraud.

4. The computerized-method of claim 1, wherein the rate of dataset imbalance is calculated by dividing an amount of fraud transactions by an amount of non-fraud transactions.

5. The computerized-method of claim 1, wherein the 'k' supervised ML model is XGBoost.

6. The computerized-method of claim 1, wherein the unsupervised ML model is selected from: Cluster-based Local Outlier Factor (CBLOF), Histogram-based Outlier Score (HBOS), Isolation Forest, k-nearest neighbors (KNN), Local Outlier Factor (LOF), Minimum Covariance Determinant (MCD), One-Class Support Vector Machines (OCSVM) and Principal Component Analysis (PCA).

7. The computerized-method of claim 1, wherein the first-final-score is calculated based on formula I:

$$\text{first-final-score} = \frac{1}{k}\sum_{i=0}^{k}(\text{score}_i * w_i) \quad \text{(I)}$$

whereby:

k is a number of datasets having dataset imbalance above a preconfigured threshold, score$_i$ is a risk score yielded by a trained supervised ML model$_i$ for the financial transaction, and w$_i$ is a weight of dataset i, wherein the weight is based on a rate of dataset imbalance that related supervised ML model has been trained on.

8. The computerized-method of claim 1, wherein the second-final-score is calculated based on formula II:

$$\text{second-final-score} = \frac{1}{L}\sum_{i=0}^{L}(\text{score}_i * w_i) \quad \text{(II)}$$

whereby:

L is a number of datasets having dataset imbalance below a preconfigured threshold, scorei is a risk score yielded by an unsupervised ML modeli for the financial transaction, and wi is a weight of dataset i, wherein the weight is based on a rate of dataset imbalance that related unsupervised ML model has been provided to.

9. The computerized-method of claim 1, wherein the 'K' yielded trained objects are provided to the final-supervised ML model each with an attributed weight.

10. The computerized-method of claim 9, wherein the attributed weight is based on a rate of dataset imbalance that related supervised ML model has been trained on.

11. The computerized-method of claim 1, wherein the average-weight-supervised is calculated based on formula III:

$$\text{average-weight-supervised} = \frac{1}{K}\sum_{i=1}^{K} w_i \quad \text{(III)}$$

whereby:

k is a number of datasets having dataset imbalance above a preconfigured threshold, and wi is a weight of dataset i, wherein the weight is based on a rate of dataset imbalance that related supervised ML model has been trained on.

12. The computerized-method of claim 1, wherein the average-weight-unsupervised is calculated based on formula IV:

$$\text{average-weight-supervised} = \frac{1}{L}\sum_{i=1}^{K} w_i \quad \text{(IV)}$$

whereby:

L is a number of datasets having dataset imbalance below the preconfigured threshold, K is a number of datasets with identified rate of dataset imbalance above the preconfigured threshold, and wi is a weight of dataset i, wherein the weight is based on a rate of dataset imbalance that related unsupervised ML model has been provided to.

13. The computerized-method of claim 1, wherein the prediction of fraud of each financial transaction in the stream of financial transactions is a regression risk-score.

\* \* \* \* \*